Figure 1:
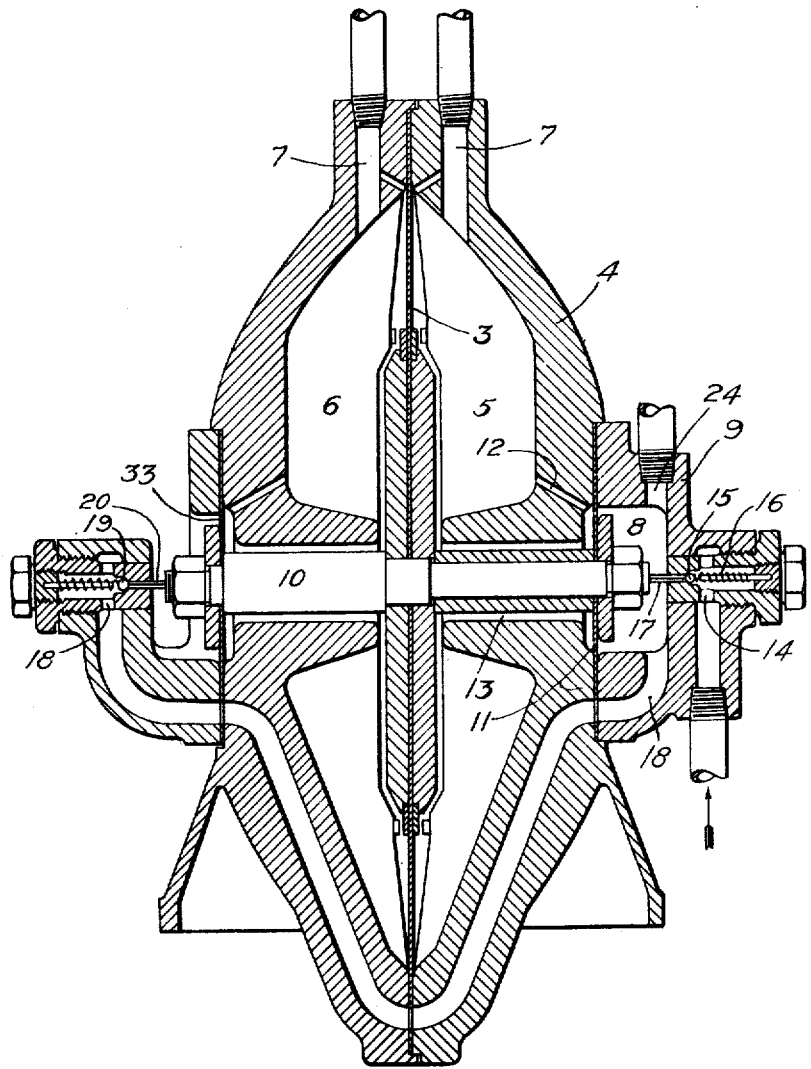

H. T. HERR & O. T. POST.
FLOW METER.
APPLICATION FILED JULY 26, 1915.

1,279,693.

Patented Sept. 24, 1918.
2 SHEETS—SHEET 1.

INVENTORS
Herbert T. Herr
Otto T. Post.
BY
THEIR ATTORNEY IN FACT

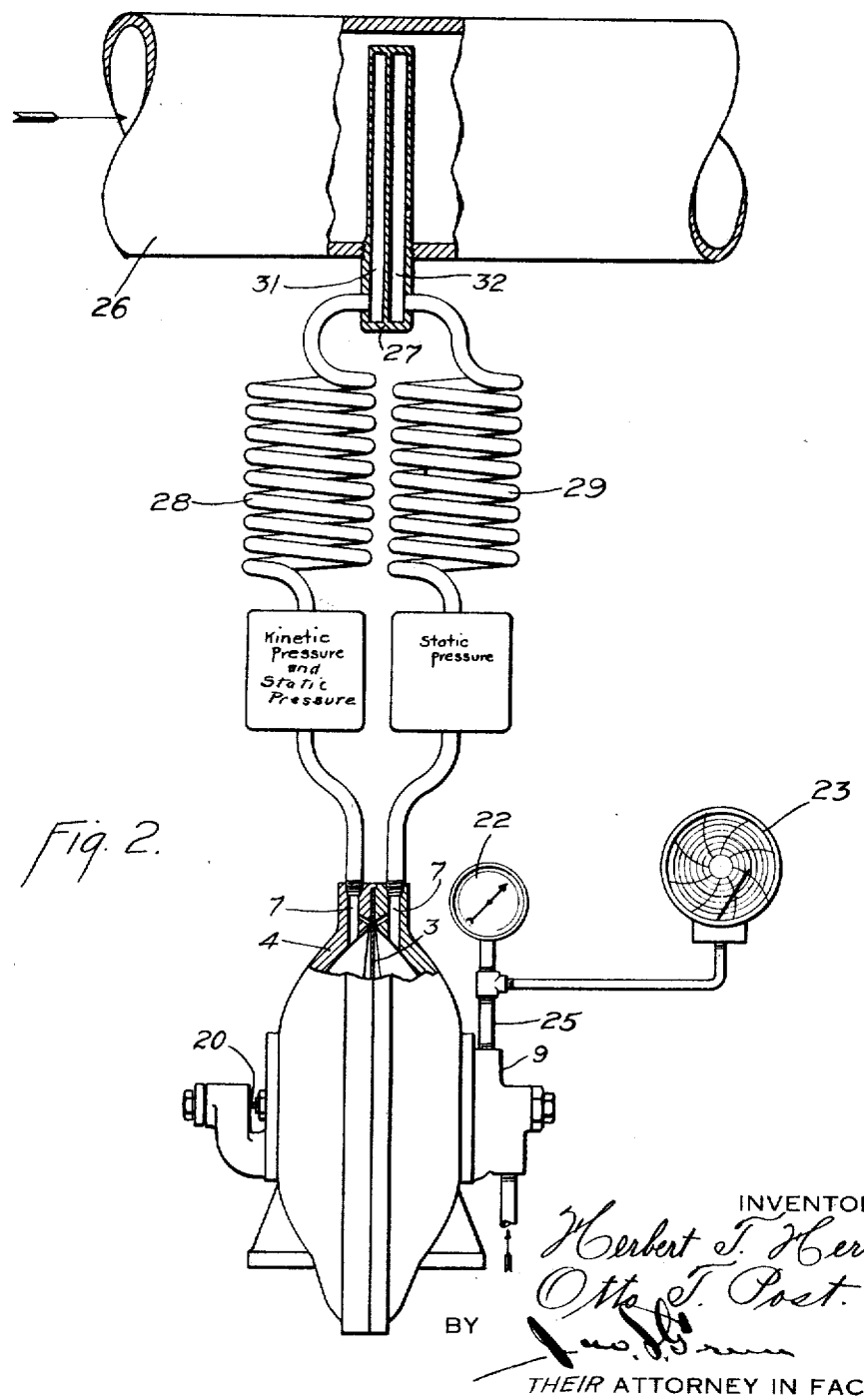

UNITED STATES PATENT OFFICE.

HERBERT T. HERR AND OTTO T. POST, OF PITTSBURGH, PENNSYLVANIA, ASSIGNORS TO WESTINGHOUSE ELECTRIC & MANUFACTURING COMPANY, A CORPORATION OF PENNSYLVANIA.

FLOW-METER.

1,279,693.   Specification of Letters Patent.   Patented Sept. 24, 1918.

Application filed July 26, 1915.   Serial No. 42,004.

*To all whom it may concern:*

Be it known that we, HERBERT T. HERR, a citizen of the United States, and OTTO T. POST, a subject of the Emperor of Germany, both residents of Pittsburgh, in the county of Allegheny and State of Pennsylvania, have made a new and useful Invention in Flow-Meters, of which the following is a specification.

This invention relates to flow meters and has for an object to produce a meter of that character, which is of simpler construction, more accurate in operation and more durable in use than flow meters now in use and known to us.

A further object is to produce an apparatus for delivering fluid or liquid at a relatively high pressure, in which means, sensitive to relatively small pressures or differential pressures, is employed for varying the pressure of the liquid or fluid delivered proportionally to variations in the relatively small actuating pressures.

These and other objects, which will be made apparent throughout the further description of the invention, are attained by means of apparatus embodying the features herein illustrated and described.

In the drawings accompanying and forming a part hereof, Figure 1 is a central transverse sectional view of apparatus embodying our invention.

Fig. 2 is a view illustrating a flow meter, embodying our invention, operatively connected to a Pitot tube; portions of the apparatus being shown broken away and in section for convenience of illustration.

It is difficult to maintain the accuracy of flow meters now in use, since such apparatus are of necessity of frail and light construction and consequently are extremely fragile and must be handled and operated with great care. In addition to this, the ordinary forms of differential pressure gages and recording apparatus employed in connection with flow meters now in use are not accurate when subjected to wider variations in pressure than those for which they are designed. These difficulties are overcome by our invention and commercial pressure gages and recording apparatus, which are accurate for all pressures, may be employed with meters embodying the invention, and in addition to this, flow meters constructed in accordance with the invention are strong and durable and may be subjected to great variations in pressure without detriment to their operativeness or their accuracy.

The invention broadly consists in providing means for multiplying the effect of an actuating pressure by varying the intensity of a relatively large pressure, proportionally to variations in the actuating pressure.

The illustrated embodiment of the invention includes a pressure sensitive diaphragm 3, which is inclosed within a casing 4 and divides the casing into two chambers 5 and 6, each of which is provided with a port 7, adapted to receive fluid or liquid under pressure. The chambers 5 and 6 are so arranged within the casing that the exposed area of the diaphragm 3, within the chamber 5, is exactly equal to its exposed area within the chamber 6. Variations in the position of the diaphragm are adapted to control the delivery of pressure fluid to and the discharge of pressure fluid from a chamber 8, which may be termed a measuring chamber and as illustrated, is formed within a casing 9, mounted on the casing 4. For the purpose of accomplishing this regulation of the pressure within the chamber 8, the diaphragm 3 is operatively secured to a stem or shaft 10, which extends at right angles to the diaphragm and projects at each end beyond the casing 4. One end of the stem 10 projects through and is secured to a flexible diaphragm 11, which forms one wall of the measuring chamber 8, and which is exposed on one side to the pressure within the chamber 5. This pressure may be transmitted to the diaphragm 11 through a port or passage 12 formed in the casing 4 or through the clearance space 13 between the casing 4 and the stem 10. It will be understood that the connection between the stem 10 and the diaphragm 11 is fluid tight. The casing 9 is provided with an inlet port 14, which is controlled by a valve 15, shown as a ball check valve and provided with a light spring 16 for moving it to its seat in opposition to the pressure within the chamber 8. This valve is capable of being opened by means of a pin 17, actuated by the stem 10, and so proportioned as to length that the valve 15 will be moved from its seat and will admit fluid under pressure through the port 14 to the chamber 8, when the diaphragm is moved from its central or normal position, toward the chamber 8, or by a preponderance of pressure within the chamber 6 over that in chamber 5. The chamber 8 is also provided with an exhaust port or passage 18, which is controlled by a valve 19, similar in construction to the valve 15. The valve 19 is in turn controlled by a pin 20, adapted to be actuated by the stem 10, to move the valve 19 from its seat when the diaphragm 3 is deflected from its normal position away from the chamber 8, or by a preponderance of the pressure within the chamber 5 over that existing in the chamber 6. The pins 17 and 20 are of such length, and the stem 10 is so designed that both valves 15 and 19 will be closed when the diaphragm 3 is in the intermediate or normal position.

With this arrangement a preponderance of pressure in the chamber 6 over that in the chamber 5 will actuate the diaphragm 3 to deliver fluid under pressure to the chamber 8. The delivery of fluid in the chamber 8 will cause the pressure in that chamber to build up and finally the lateral thrust of the diaphragm 3, occasioned by the preponderating pressure within the chamber 6, will be counterbalanced by the pressure in the chamber 8 acting on the diaphragm 11 and the pressure within the chamber 5 on the diaphragm 3. As soon as these forces are in equilibrium, the diaphargm 3 will move to its normal or intermediate position and permit the valve 15 to close. This equilibrium of forces will be maintained until the pressure varies within either the chamber 5 or the chamber 6. If, for example, the pressure within the chamber 6 decreases, the preponderating laterally acting force occasioned by the pressures within the chambers 8 and 5, will cause the diaphragm 3 to move to open the valve 19 and thereby reduce the pressure within the chamber 8 and reëstablish an equilibrium of forces acting on the diaphragm 3. In this way the pressure within the chamber 8 is always proportional to the pressure within the chamber 6 or to the differential of pressure between the chambers 5 and 6. In addition to this, leakage of either the valves 15 or 19 will not materially affect the accuracy of the apparatus, since it will adjust itself to compensate for the leakage.

In commercial installations we preferably connect an indicating device such as a gage 22, or a recording mechanism 23, or both a gage and a recording mechanism to the chamber 8. As illustrated in Figs. 1 and 2, the chamber 8 is provided with a port 24, through which pressure to the indicating or recording mechanism is delivered by means of pipes or piping 25.

Inasmuch as the apparatus may be adjusted to maintain air or liquid under any desired pressure within the chamber 8, the recording and indicating apparatus employed may be of ordinary commercial size and be adapted to indicate or record large variations in pressure. In addition to this, the indicating and recording apparatus may be located at any distance from the chamber 8 without materially affecting the accuracy of the apparatus, and consequently the meter proper may be located immediately adjacent to the pipe or passage through which the flow of fluid is to be metered.

In Fig. 2 we have shown the flow meter connected to a pipe 26 through the agency of a Pitot tube 27 and condensation coils 28 and 29. The kinetic chamber 31 of the tube 27 is shown connected to the chamber 6 of the meter through the coil 28, while the static chamber 32 of the tube is connected to the chamber 5 by means of the coil 29. With this arrangement, the chambers 5 and 6 and also the tubes 28 and 29 will be filled with water of condensation when the fluid to be metered is steam. We however find it advisable to fill the chambers 5 and 6 with liquid no matter what fluid is being metered.

By mounting the meter immediately adjacent to the pipe in which the flow is to be metered, inaccuracies inherent in other flow meters are overcome, since the friction of the liquid within the meter itself and within the passages connecting with the Pitot tube, are rendered insignificant by employing the short passages.

By proportioning the size of the exposed area of the diaphragm 11 within the chamber 8, relatively to the effective area of the diaphragm 3, pressures of any intensity may be employed for actuating the indicating and recording mechanisms. We preferably so construct the apparatus that the effective area of the diaphragm 11 is small as compared to that of the diaphragm 3, and consequently while the pressure within the chamber 8 is always proportional to the pressure actuating the diaphragm 3, it will be a multiple of the actuating pressure or, in other words, a multiple of the differential pressure, and the constant will be fixed by the ratio of the areas of the two diaphragms.

For example, the areas of the diaphragms 3 and 11 may be so proportioned, that a variation of three ounces in differential pressure actuating the diaphragm 3, will cause a variation of 3 pounds in the chamber 8. It will be understood that the indicating mechanism receiving actuating pressure from the chamber 8 may be so calibrated that it will indicate or record the true variations in the differential pressure, actuating the diaphragm 3.

In the apparatus as illustrated, we have provided a diaphragm 33, which is similar to the diaphragm 11, in its construction and in its connection to the stem 10, but which is located at the exhaust-valve end of the stem and is exposed on one side to atmospheric pressure and on the other side to the pressure existing within the chamber 6. With this arrangement, the construction of the meter is simplified and, in addition to this, its accuracy is not affected by variations of atmospheric pressure, since the pressure within the chamber 8 will be automatically adjusted to compensate for such changes. Such an arrangement is necessary where the indicating or recording apparatus communicating with the chamber 8 are exposed to the atmospheric pressure. From this it will be apparent that where gages are employed which are not exposed to atmospheric pressure, the construction above described need not be employed.

While we have described but one embodiment of our invention, it will be apparent that various changes, modifications, substitutions, additions and omissions may be made in the apparatus illustrated without departing from the spirit and scope of our invention as set forth by the appended claims:

1. In a device of the character described, a casing, a diaphragm located within the casing and dividing the interior thereof into two pressure chambers, a valve actuating plunger operatively secured to and movable with said diaphragm, a second diaphragm operatively secured to said plunger, and exposed on one side to the pressure in one of said pressure chambers, and on the other to a controllable fluid pressure in an auxiliary pressure chamber, a third diaphragm operatively secured to said plunger and subjected on one side to the pressure in the other pressure chamber and on the other side to the pressure of the atmosphere, an inlet valve controlled by said plunger for controlling the delivery of fluid under pressure to said auxiliary pressure chamber, and an exhaust valve controlled by said plunger for exhausting pressure from said auxiliary pressure chamber.

2. In a device of the character described, a casing, a diaphragm dividing the interior of the casing into two pressure chambers and responsive to variations in the differential pressure acting upon it, a plunger extending through the diaphragm and actuated thereby, an auxiliary pressure chamber formed on one side of the casing, a diaphragm forming one side of said chamber operatively connected to one end of the plunger and subjected on one side to the pressure of the fluid within one of the first mentioned chambers, a diaphragm on the other side of the casing operatively connected to the other end of the plunger and subjected on one side to the pressure of the atmosphere and on the other side to the pressure of the fluids in the other of said first mentioned chambers, and valves on opposite sides of the casing and controlled by the plunger for controlling the delivery of fluid to and the discharge of fluid from the auxiliary pressure chamber.

In testimony whereof, we have hereunto subscribed our names this 23rd day of July, 1915.

HERBERT T. HERR.
OTTO T. POST.

Copies of this patent may be obtained for five cents each, by addressing the "Commissioner of Patents. Washington, D. C."